United States Patent
Flandrin et al.

(10) Patent No.: US 7,634,395 B2
(45) Date of Patent: Dec. 15, 2009

(54) METHOD OF GENERATING A CONFORMING HYBRID GRID IN THREE DIMENSIONS OF A HETEROGENEOUS FORMATION CROSSED BY ONE OR MORE GEOMETRIC DISCONTINUITIES IN ORDER TO CARRY OUT SIMULATIONS

(75) Inventors: Nicolas Flandrin, Nanterre (FR); Chakib Bennis, Rueil Malmaison (FR); Houman Borouchaki, Paris (FR); Patrick Lemonnier, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 619 days.

(21) Appl. No.: 11/134,444

(22) Filed: May 23, 2005

(65) Prior Publication Data

US 2005/0273303 A1 Dec. 8, 2005

(30) Foreign Application Priority Data

May 21, 2004 (FR) .................................. 04 05555

(51) Int. Cl.
G06G 7/48 (2006.01)
(52) U.S. Cl. .............................. 703/10; 703/2; 345/419
(58) Field of Classification Search ..................... 703/10
See application file for complete search history.

(56) References Cited

U.S. PATENT DOCUMENTS

| | | | | |
|---|---|---|---|---|
| 5,740,342 | A * | 4/1998 | Kocberber | 345/420 |
| 5,844,564 | A * | 12/1998 | Bennis et al. | 345/423 |
| 6,078,869 | A * | 6/2000 | Gunasekera | 702/6 |
| 6,256,599 | B1 * | 7/2001 | Tiribuzi | 703/2 |
| 6,674,430 | B1 * | 1/2004 | Kaufman et al. | 345/419 |
| 6,823,297 | B2 * | 11/2004 | Jenny et al. | 703/2 |

(Continued)

FOREIGN PATENT DOCUMENTS

EP 1 394 569 3/2004

(Continued)

OTHER PUBLICATIONS

Amado et al, "A Finite Volume Approach With Triangular Grids in Reservoir Simulation", SPE 23633, SPE Advanced Technology Series, Volume, No. 1, 1994.*

(Continued)

*Primary Examiner*—Paul L Rodriguez
*Assistant Examiner*—Mary C Jacob
(74) *Attorney, Agent, or Firm*—Antonelli, Terry, Stout & Kraus, LLP.

(57) ABSTRACT

A method, having application for hydrocarbon reservoir simulation, generates a hybrid grid, in order to carry out simulations in accordance with a defined numerical scheme, in three dimensions in a numerical scheme, of a heterogeneous formation crossed by at least one geometric discontinuity such as, an underground formation where at least one well has been drilled, or a fractured formation, by combining structured grids and unstructured grids. The hybrid grid includes a first structured grid for gridding the heterogeneous medium with second structured grids for gridding a zone around each discontinuity. A cavity of minimum size is automatically generated, with cells of the transition grid being an intermediate size between the size of the cells of the first grid and the size of the cells of the second grids.

23 Claims, 9 Drawing Sheets

U.S. PATENT DOCUMENTS

| | | | |
|---|---|---|---|
| 6,907,392 B2* | 6/2005 | Bennis et al. | 703/10 |
| 7,043,413 B2* | 5/2006 | Ward et al. | 703/10 |
| 7,047,165 B2* | 5/2006 | Balaven et al. | 703/2 |
| 7,096,122 B2* | 8/2006 | Han | 702/13 |
| 7,152,017 B2* | 12/2006 | Tanahashi et al. | 703/2 |
| 7,260,508 B2* | 8/2007 | Lim et al. | 703/2 |
| 7,292,241 B2* | 11/2007 | Thore et al. | 345/420 |
| 2001/0006387 A1* | 7/2001 | Bennis et al. | 345/418 |
| 2002/0038201 A1* | 3/2002 | Balaven et al. | 703/2 |

FOREIGN PATENT DOCUMENTS

| | | |
|---|---|---|
| FR | 2 801 710 | 6/2001 |

OTHER PUBLICATIONS

Boissonnat et al, "Conforming Orthogonal Meshes", 11th International Meshing Roundtable. Ithaca, New York, Sep. 2002.*

Edwards, Michael "Control-Volume Distributed Sub-Cell Flux Schemes for Unstructured and Flow Based Grids", SPE Reservoir Simulation Symposium, Houston, Texas, Feb. 3-5, 2003, SPE 79710.*

Lee et al, "New Developments in Multiblock Reservoir Simulation: Black Oil Modeling, Nonmatching Subdomains and Near-Well Upscaling", SPE Reservoir Simulation Symposium, Houston, Texas, Feb. 3-5, 2003, SPE 79682.*

Balaven et al, "Generation of Hybrid Grids Using Power Diagrams", Proceedings of Numerical Grid Generation in Field Simulations, $7^{th}$ International Conference on Numerical Grid Generation in Computational Field Simulations, 2000.*

Balaven-Clermidy, "Generation de Maillages Hybrides Pour la Simulation Des Reserviors Petroliers", Thesis, Ecole des Mines, Paris, Dec. 2001, English Translation, sections 4.3-4.4.2.*

Kuwauchi et al, "Development and Applications of Three Dimensional Voronoi-Based Flexible Grid Black Oil Reservoir Simulator", SPE 37028, SPE Asia Pacific Oil & Gas Conference, Oct. 28-31, 1996.*

Aavatsmark et al, "Control-Volume Discretization Methods for 3D Quadrilateral Grids in Inhomogeneous, Anisotropic Reservoirs", SPE Journal, Jun. 1998.*

George, P. L., et al : "An Efficient Algorithm for 3C Adaptive Meshing", Advances in Engineering Software, vol. 33, No. 7-10, Jul. 2002, pp. 377-387, XP002315645 Elsevier UK, ISSN: 0965-9978.

Lira, W. M. et al: A Modeling Methodology for Finite Element Mesh Generation of Multi-Region Models with Parmetric Surfaces, Computers and Graphics, Pergamon Press Ltd., Ocford, GB, vol. 26, No. 6, Dec. 2002, pp. 907-918, XP004417173, ISSN: 0097-8493.

* cited by examiner

Fig. 10C
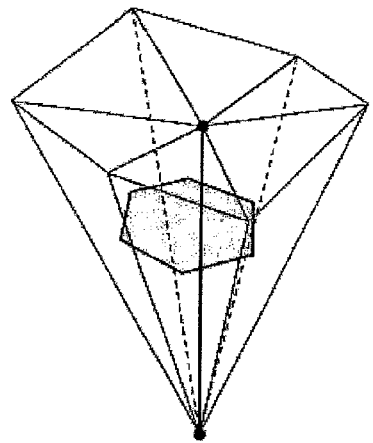
Fig. 11
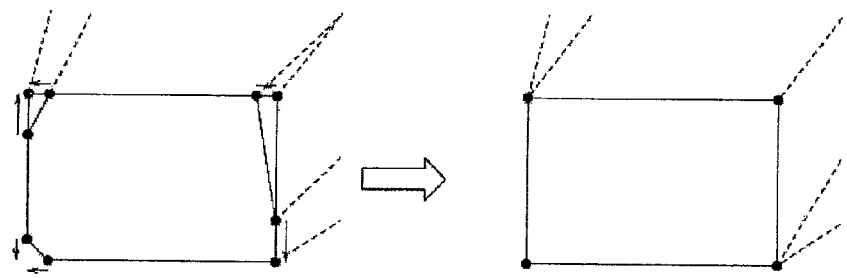
Fig. 12A                Fig. 12B
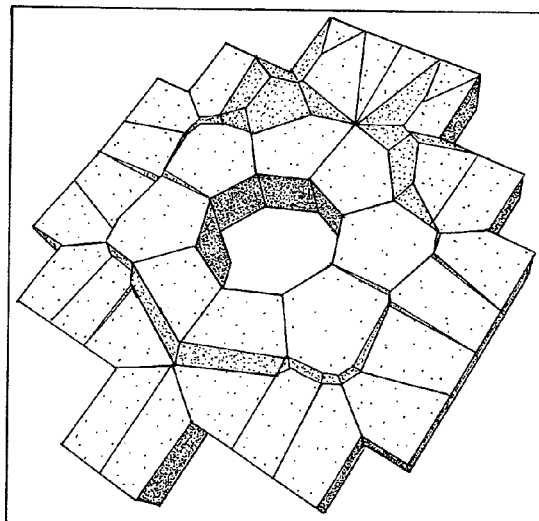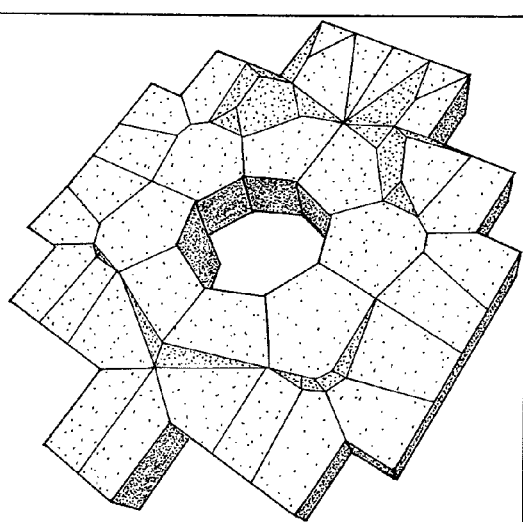

METHOD OF GENERATING A CONFORMING HYBRID GRID IN THREE DIMENSIONS OF A HETEROGENEOUS FORMATION CROSSED BY ONE OR MORE GEOMETRIC DISCONTINUITIES IN ORDER TO CARRY OUT SIMULATIONS

BACKGROUND OF THE INVENTION

1. Field of the Invention

The present invention relates to a computer implemented method of generating a three dimensional hybrid grid of a heterogeneous formation crossed by one or more geometric discontinuities in order to carry out flow simulations.

The method applies more specifically to the formation of a grid of an underground reservoir crossed by one or more wells, or by fractures or faults, in order to model displacement of fluids such as hydrocarbons.

2. Description of the Prior Art

During development of a hydrocarbon reservoir, it is essential to be able to simulate gas or oil production profiles in order to assess cost-effectiveness, to validate or to optimize the position of the wells providing development and production. The repercussions of a technological or strategic change on the production of a reservoir also have to be estimated (location of the new wells to be drilled, optimization and selection during well completion, . . . ). Flow simulation calculations are therefore carried out within the reservoir which allow prediction of, according to the position of the wells and to certain petrophysical characteristics of the medium, such as porosity or permeability, the evolution with time of the proportions of water, gas and oil in the reservoir.

First of all, better comprehension of these physical phenomena requires 3D simulation of the multiphase flows in increasingly complex geologic structures, in the vicinity of several types of singularities such as stratifications, faults and complex wells. It is therefore essential to provide the numerical schemes with a correctly discretized field of study. Generation of a suitable grid then becomes a crucial element for oil reservoir simulators because it allows description of the geometry of the geologic structure studied by means of a representation in discrete elements. This complexity has to be taken into account by the grid which has to reproduce as accurately as possible the geology and all its heterogeneities.

Furthermore, to obtain a precise and realistic simulation, the grid has to be suited to the radial directions of flow in the vicinity of the wells, in the drainage zones.

Finally, grid modelling has made great advances during the past few years in other fields such as aeronautics, combustion in engines or structure mechanics. However, the gridding techniques used in these other fields cannot be applied as they are to the petroleum industry because the professional constraints are not the same. The numerical schemes are of finite difference type, which requires using a Cartesian grid, which is too simple to describe the complexity of the subsoil heterogeneities or, for most of them, of finite element type, suited to solve elliptic or parabolic problems, and not hyperbolic equations such as those obtained for the saturation. The finite difference and finite element type methods are therefore not suited for reservoir simulation, with only the finite volume type methods being suitable. The latter is the most commonly used method for reservoir simulation and modelling. It discretizes the field of study into control volumes on each one of which the unknown functions are approximated by constant functions. In the case of cell-centered finite volumes, the control volumes correspond to the cells and the discretization points are the centers of these cells. The advantage of this method is that the definition of the control volumes is readily generalized to any grid type, whether structured, unstructured or hybrid. Besides, the finite volume method remains close to the physics of the problem and meets the mass conservation principle (the mass balances of the various phases are written on each cell). Furthermore, it is particularly well-suited to the solution of hyperbolic type non-linear equations. It is therefore particularly suitable for solution of the hyperbolic saturation system. Therefore, hereafter cell-centered finite volume methods are used.

In fact, the grid allowing performing reservoir simulations has to be suited to:

describe the complexity of the geometry of the geologic structure studied, the radial directions of flow in the vicinity of the wells, in the drainage zones, and the simulations by means of cell-centered finite volume type methods.

The grids which have been proposed and used to date in the petroleum industry are of three types: entirely structured, totally unstructured or hybrid, i.e. a mixture of these two grid types.

1. Structured grids are grids whose topology is fixed: each inner vertex is incident to a fixed number of cells and each cell is delimited by a fixed number of sides and edges. Cartesian grids (FIG. 1) can for example be mentioned, which are widely used in reservoir simulation, as well as CPG (Corner-Point-Geometry) type grids, described for example in French Patent 2,747,490 corresponding to U.S. Pat. No. 5,844,564 filed by the assignee, and grids of circular radial type (FIG. 2) allowing the drainage area of the wells to be modelled.

2. Unstructured grids have a completely arbitrary topology: a vertex of the grid can belong to any number of cells and each cell can have any number of edges or sides. The topological data therefore have to be permanently stored to explicitly know the neighboring nodes of each node. The memory cost involved by the use of an unstructured grid can therefore become very rapidly penalizing. However, they allow description of the geometry around the wells and representing complex geologic zones. The grids of PErpendicular BIssector (PEBI) or Voronoi type proposed in the following document can for example be mentioned:

Z. E. Heinemann, G. F. Heinemann and B. M. Tranta, "*Modelling Heavily Faulted Reservoirs*", Proceedings of SPE Annual Technical Conferences, pp. 9-19, New Orleans, La., September 1998, SPE.

Structured grids have already shown their limits: their structured nature facilitates their use and implementation, but this also gives them a rigidity that does not allow all the geometric complexities of the geology to be represented. Unstructured grids are more flexible and they have allowed obtaining promising results but they still are 2.5D grids, that is the $3^{rd}$ dimension is obtained only by vertical projection of the 2D result, and their lack of structure makes them more difficult to use.

3. To combine the advantages of the two approaches, structured and unstructured, while limiting the drawbacks thereof another type of grid has been considered: the hybrid grid. It is a combination of different grid types and it allows to make the most of their advantages, while trying to limit the drawbacks thereof.

A local refinement hybrid method has been proposed in:

O. A. Pedrosa and K. Aziz, "*Use of Hybrid Grid in Reservoir Simulation*", Proceedings of SPE Middle East Oil Technical Conference, pp. 99-112, Bahrain, March 1985.

This method models a radial flow geometry around a well in a Cartesian type reservoir grid. The junction between the cells of the reservoir and of the well is then achieved using hexahedral type elements. However, the vertical trajectory followed by the center of the well must necessarily be located on a vertical line of vertices of the Cartesian reservoir grid.

To widen the field of application of this method, to take account of the vertical, horizontal wells and the faults in a Cartesian type reservoir grid, a new local refinement hybrid method has been proposed in:

S. Koeberber, "*An Automatic Unstructured Control Volume Generation System for Geologically Complex Reservoirs*", Proceedings of the 14$^{th}$ SPE symposium on reservoir Simulation, pp. 241-252, Dallas, June 1997.

This method joins the reservoir grid and the well grid, or the reservoir grid blocks to the fault edges, by pyramidal, prismatic, hexahedral or tetrahedral type elements. However, the use of pyramidal or tetrahedral cells does not allow use of a cell-centered finite volume type method.

Finally, French Patents 2,802,324 and 2,801,710 filed by the assignee describe another type of hybrid model allowing accounting, in 2D and 2.5D, the complex geometry of the reservoirs and the radial directions of flow in the vicinity of the wells. This hybrid model allows very precise simulation of the radial nature of the flows in the vicinity of the wells by means of a cell-centered finite volume type method. It is structured nearly everywhere, which facilitates its use. The complexity inherent in the lack of structure is introduced only where it is strictly necessary, that is in the transition zones of reduced size. Calculations are fast and taking account of the directions of flow through the geometry of the wells increases their accuracy. Although this 2.5D hybrid grid has allowed taking a good step forward in reservoir simulation in complex geometries, the fact remains that this solution does not allow obtaining an entirely realistic simulation when the physical phenomena modelled are really 3D. It is the case, for example, for a local simulation around a well.

Furthermore, these hybrid grid construction techniques require creating a cavity between the reservoir grid and the well grid. S. Balaven-Clermidy describes, in "Génération de Maillages Hybrides Pour la Simulation des Réservoirs Pétroliers" (thesis, Ecole des Mines, Paris, December 2001), various methods for defining a cavity between the well grid and the reservoir grid: the minimum size cavity (by simple deactivation of the cells of the reservoir grid overlapping the well grid), the cavity obtained by expansion and the cavity referred to as Gabriel cavity. However, none of these methods is really satisfactory: the space created by the cavity does not allow the transition grid to keep an intermediate cell size between the well grid cells and the reservoir grid cells.

SUMMARY OF THE INVENTION

The method according to the invention allows extension of the field of application of hybrid grids. It extends in three dimensions their generation process by using new algorithms which are robust and efficient. It provides, on the one hand, a new approach generating entirely automatically a cavity of minimum size while allowing the transition grid to keep an intermediate cell size between the size of the well grid cells and the size of the reservoir grid cells. It also constructs a transition grid meeting the constraints of the numerical scheme used for simulation. Finally, it defines criteria allowing measuring of the quality of the grid, then in proposing optimization methods for a posteriori improvement thereof, to define a perfectly admissible transition grid in the sense of the numerical scheme which is selected.

The invention relates to a method of generating a hybrid grid suited to a heterogeneous medium crossed by at least one geometric discontinuity, in order to form a model representative of fluid flows in this formation in accordance with a defined numerical scheme. The method comprises forming at least a first structured grid for gridding at least part of the heterogeneous medium, forming at least a second structured grid for gridding at least part of the geometric discontinuity, forming at least one cavity around the second grid and forming at least one unstructured transition grid providing transition between the structured grids. This method generates a hybrid grid in three dimensions comprising:

defining a minimum cavity size to allow the transition grid to be created;

constructing the transition grid by accounting for at least one of the following constraints: conformity, convexity, orthogonality and self-centering of the cells; and optimizing the hybrid grid obtained from at least one quality criterion determined in relation to the numerical scheme.

According to the invention, the numerical scheme can comprise a two-point approximation of the fluid flows such as, for example, a finite volume type numerical scheme.

The first grid can be of non-uniform Cartesian type with parallelepipedic cells. If the geometric discontinuity is a well, the second structured grid can be of circular radial type. If the geometric discontinuity is a fracture, the second structured grid can be of CPG type. As for the unstructured transition grid, it can be a convex polyhedral cells resting on quadrilaterals bordering said cavity.

According to the invention, the construction of the cavity comprises an expansion of the geometric discontinuity using a determined local expansion coefficient ($\alpha$) so as to construct a transition grid that keeps an intermediate cell size between the size of the well grid cells and the size of the reservoir grid cells. This local expansion coefficient can be expressed as a function of at least one of the following parameters: discontinuity description parameters, discontinuity grid description parameters and parameters linked with the local edge size of the reservoir.

Construction of the transition grid can comprise the following stages:

defining the sites of the transition grid from either a Delaunay triangulation of the vertices of the cavity and of the topology of the sites of the cavity boundary, or from the barycenter or the center of the circumscribed sphere of the cells of the reservoir and of the well which share at least one side with the boundary of the cavity, correcting the sites of the cavity so as to obtain non-empty and self-centered cells;

constructing a power diagram of the sites from a regular triangulation in three dimensions of all the sites of the cavity; and correcting the power diagram in order to obtain a conforming hybrid grid.

According to the invention, evaluation of the center of the circumscribed sphere can comprise the following stages for a cell sharing at least one side with the boundary of the cavity:

carrying out an estimation of the center of the sphere of the cell by determining a point in space passing closest to eight vertices of cell, by an approximation utilizing least squares, determining discretization point P associated with the site, by displacing iteratively in the space the center, to minimize a maximum distance between the center and each of the vertices of the side of the cell shared with the cavity; and defining weight $\omega$ associated with each site of the cavity by defining $\omega$ as the mean distance from P to each vertex of the side of said cell shared with said cavity.

Construction of the power diagram of the sites can be carried out from tetrahedrons resulting from a three-dimensional regular triangulation of all the sites of the cavity.

According to the invention, the power diagram can be corrected in order to obtain a conforming hybrid grid by replacing the vertices of the cells of the transition grid belonging to a boundary side by the closest constraint vertex of boundary quadrilaterals.

Construction of the power diagram can comprise the following stages:

performing a determination of tetrahedrons made up of sites internal and external to the cavity; and replacing, during construction of the power diagram, the centers of spheres circumscribed about the tetrahedrons by a vertex of the cavity common to the quadrilaterals associated with the four vertices forming the tetrahedron in question.

According to the invention, the Delaunay triangulation and the regular triangulation can be carried out by means of an incremental method.

Optimization of the hybrid grid can comprise at least one of the following stages:

eliminating small edges of a size below a value depending on at least one global parameter ($\delta$) and on at least one local parameter ($h_i$), by elimination and/or expansion of the edges under control of quality criteria in the sense of the numerical scheme (orthogonality, planarity and self-centering), to improve the shape regularity of the hybrid grid; and displacing the sites of the cavity towards their center of mass under control of quality criteria of the numerical scheme (orthogonality).

The quality criteria of the numerical scheme can be quality criteria applicable to polyhedral cells, and the controls of these quality controls can be defined as follows orthogonality control wherein a transition cell is referred to as orthogonal if its orthogonality is greater than or equal to a fixed threshold;

planarity control wherein a transition cell is referred to as planar if its planarity is less than or equal to a fixed threshold; and self-centering control wherein a cell is referred to as self-centered if its site is inside it.

BRIEF DESCRIPTION OF THE DRAWINGS

Other features and advantages of the method according to the invention will be clear from reading the description hereafter of non limitative examples, with reference to the accompanying drawings wherein:

FIG. 10C illustrates the generation of a side of the power diagram using the duality with the regular triangulation;

FIG. 11 illustrates an example of a transition cell made conforming by removal of 5 vertices and 3 sides;

FIGS. 12A and 12B illustrate the result of the optimization stage;

DETAILED DESCRIPTION OF THE INVENTION

The method according to the invention allows generation of a 3D hybrid grid allowing accounting for physical phenomena occurring close to geometric discontinuities, such as wells or fractures, during reservoir simulations. This grid is, on the one hand, suited to the complexity of the geometry of the geologic structure being studied and, on the other hand, to the radial directions of flow in the vicinity of the wells, in the drainage zones. In the petroleum industry, it is also necessary for these grids to be admissible in the finite volumes sense. To meet this condition, the grid should have the following properties:

discretization of the flow equations is carried out by two-point approximations. This implies that, through a single side, a cell cannot have more than one neighboring cell. This property is known as conformity;

to express the pressure gradient along the normal to a side, a two-point approximation between the two adjacent cells is used (numerical schemes where the flow approximation is a two-point approximation). This implies that, for each cell, a cell center (or discretization point) has to be defined. Such an approximation is therefore acceptable only if the line connecting the centers of two adjacent cells is orthogonal to their common side. This property is referred to as grid orthogonality;

it immediately follows from the above property that the cells are convex;

although, in theory, the discretization points can be located outside their cell, solution of the various unknowns of the flow problem compels keeping the points in their cell. The cell is then referred to as self-centered and the self-centering property of the grid is referenced.

The method according to the invention allows generation of a 3-dimensional hybrid grid admissible in the finite volumes sense. It comprises four main stages generation of the structured reservoir and well grids;

automatic definition of a cavity between the reservoir grid and the well grid;

automatic generation of an admissible transition grid;

optimization of the transition grid under quality and validity control in the finite volumes sense.

1. Generation of the Structured Reservoir and Well Grids

Figure 1:
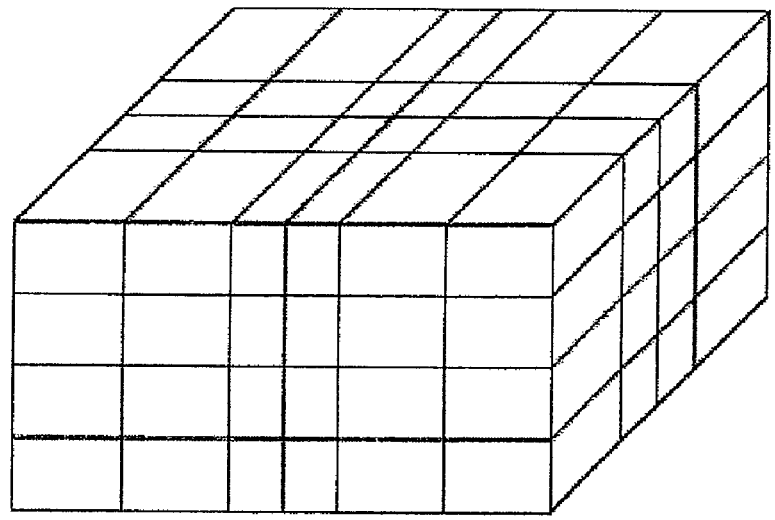
FIG. 1 shows a conforming grid of nonuniform Cartesian type with parallelepipedic cells.

The reservoir is discretized by a conforming and structured grid of non-uniform Cartesian type with hexahedral cells. In this non limitative example, this grid comprises parallelepipedic cells of variable size in directions X, Y and Z. FIG. 1 illustrates this grid type.

Figure 2:
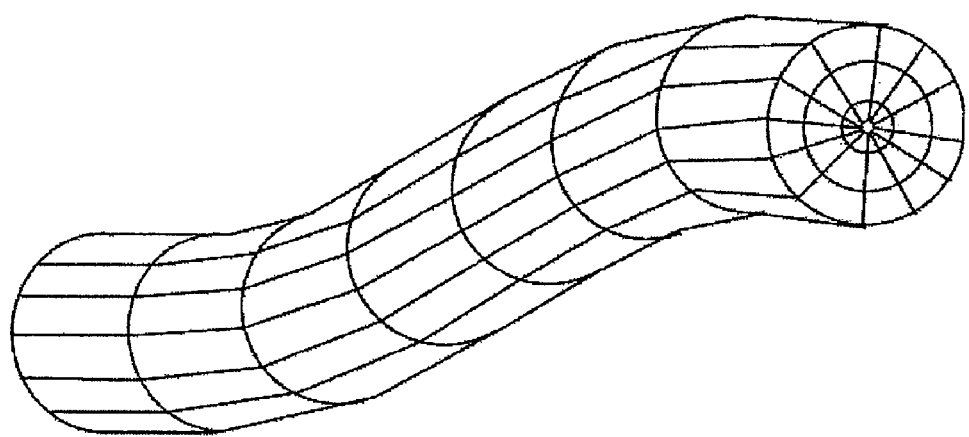
FIG. 2 shows a circular radial type grid in 3 dimensions.

The wells are discretized by a circular radial type grid (FIG. 2). In three dimensions, generation of such a grid is carried out in two stages. The first one discretizes a disc covering the well drainage area by means of quadrilaterals. The second stage extrudes the disc along the trajectory of the well. This grid type has been introduced in reservoir simulation to model the well drainage area (incorrectly referred to as well hereafter), where the velocity gradients are high and the velocity fields radial. The grid geometry then directly reflects the flow geometry.

2. Automatic Definition of a Cavity Between the Reservoir Grid and the Well Grid A non-uniform Cartesian type reservoir grid and a circular radial type well grid are assumed to be given. For better understanding, discussion is limited to the case of a single well without restricting the invention.

In order to establish a coherent connection between the well and reservoir grids, it is necessary to first deactivate a set of cells (referred to as inactive cells) close to the reservoir grid so that no cell of the well grid overlaps a reservoir cell. It is then possible to define in the cavity thus defined a transition grid connecting the reservoir to the well. The cavity representing the space to be covered by the transition grid must meet the following two properties:

Minimum size: as far as visual display, exploration or interpretation are concerned, the size of the transition zone, therefore of the cavity, is preferably limited in a hybrid grid;

Size of the cells of the transition grid: the cavity is led to be filled automatically by a transition grid whose cells must have an intermediate size between the size of the well grid cells and that of the reservoir grid cells. The size of a cell is defined, in this context, as the local size of the edges of cells. This property is linked with the shape quality criterion defined below.

Currently, no method allows defining a cavity in a really satisfactory way: the space created does not allow the transition grid to keep an intermediate cell size between the size of the well grid cells and that of the reservoir grid cells. The method according to the invention provides a new approach of generating entirely automatically a cavity meeting this criterion. It can be broken up into four main stages:

Well expansion;

Definition of the cavity: seeking a first cell belonging to the cavity, then cavity expansion;

Cavity smoothing; and

Definition of the cavity boundaries.

Well Expansion

The first stage automatically expands the well. A local expansion coefficient $\alpha$ is therefore defined (as a function of the local size of the well and reservoir grid cells) and the well is expanded as a function of this coefficient. All of the cells of the reservoir having a non-zero intersection with the expanded well image are deactivated. The value of expansion coefficient $\alpha$ is defined by the formula as follows:

$$\alpha = 1 + \frac{\delta_{well} + \delta_{resevoir}}{r}$$

where:

r is the well drainage radius, $\delta_{well}$ is the local edge size of the well, and $\delta_{reservoir}$ is the local edge size of the reservoir.

The image of the expanded well is a well of radius $r+\delta_{well}+\delta_{reservoir}$.

The space thus created between the well and the reservoir $\delta$ is of sufficient size to ensure that the cells of the transition grid have an intermediate size between the size of the well grid cells and that of the reservoir grid cells. It is written as follows: $\delta = \alpha * r - r = \delta_{well} + \delta_{reservoir}$.

Definition of the Cavity: Seeking a First Cell Belonging to the Cavity, then Cavity Expansion There is no real difficulty in constructing the defined cavity using coefficient $\alpha$. All the cells of the reservoir present in the expanded well image just have to be sought exhaustively. However, to avoid performing such a time-costly procedure, a method is applied that determines a first cell of the reservoir present in the expanded well image, then in extending the cavity by scanning, by adjacency, iteratively neighboring cells.

Seeking the first cell present in the cavity could be done in an exhaustive or a random way. However, the use of such methods can also be very CPU time-consuming: if the reservoir has several hundred thousands of cells and if the inserted well is small, for too many cells can be tested before one present in the expanded well image can be found. Therefore a very robust and very fast method is utilized: the method referred to as bucket sorting or bucketing method, described for example in:

P. J. Frey and P. L. George, "*Maillages: Applications Aux Éléments Finis*", Hermes, 1999.

A uniform regular grid in which the cells of the reservoir (or more precisely the centers of the cells) are inserted is therefore created. Thus, to find the first cell of the reservoir present in the expanded well image, it is necessary to take a point of the well (for example a point of the axis) and to determine the square n of the grid in which it is located. Sampling of the grid is selected coarser than that of the reservoir grid, with at least one cell c of the reservoir in square n. This cell c is then the first cell of the reservoir present in the cavity.

At this stage of the algorithm, the cavity has only one cell c, found using a bucket search. To find the other cells of the reservoir that intersect the expanded well image, the structured nature of the reservoir grid can be used to scan iteratively, by adjacency, the cells bordering c. The cavity is then initialized by c then, and by neighborhood, it is completed by incorporation of any cell whose barycenter is present in the expanded well image. Dynamic coloring of the cells which are already scanned is then used to avoid scanning the same cell multiple times and, thereafter, to ensure convergence of the algorithm. A cell of the reservoir n belongs to the cavity if and only if:

$$dist(G_n, axis) \leq r + \delta_n + \delta_{well}$$

where:

r is the radius of the well;

$\delta_n$ is the maximum edge size of n;

$\delta_{well}$ is the maximum edge size of the well; and $dist(G_n, axis)$ is the minimum distance between the barycenter of n and the axis of the well.

Cavity Smoothing

The invention then comprises a stage allowing smoothing of the boundary of the cavity, so that the transition grid generated afterwards is as uniform as possible. The cells of the reservoir having a non-zero intersection with the expanded well image have all been deactivated to define this cavity. However, certain inactive cells of the reservoir may be adjacent to five other active cells. This actually corresponds to cells whose belonging to the cavity is true to the nearest epsilon (very short distance, close to zero). They therefore have to be reactivated. The opposite operation also has to be performed when an active cell of the reservoir is adjacent to five other inactive cells. The direct consequence of this adjustment is a "smoothing" of the cavity and therefore a standardization of the space to be covered by the transition grid.

Definition of the Cavity Boundaries

Finally, the boundary of the cavity, at the level of the well and of the reservoir, is defined by assigning sites to the quadrilaterals bordering the cavity. What is referred to as a site is a weighted point, that is the combination of a discretization point P of the space and of a weight ω. According to the method, an internal site also corresponds to the center of a power cell, i.e. the center of a cell of the transition grid. Thus, discretization point P is a point on which the petrophysical values are assigned or calculated. The goal of the transition grid is to connect the well grid and the reservoir grid so that the global grid is conforming. The transition grid therefore has to scrupulously respect the boundary quadrilaterals of the initial grids, located on the circumference of the cavity. These quadrilaterals and their ends thus make up a set of geometric constraints to be respected. The ways of determining the geometric constraints of the reservoir and of the well are very similar. The procedure allowing extraction of the boundary quadrilaterals of the cavity, while defining the topology of the sites that will allow obtaining a transition grid respecting them, is therefore described here only within the context of the reservoir. To construct a power cell resting on a boundary quadrilateral of the cavity, a site has to be defined on either side thereof: a site internal and a site external to the cavity. Therefore, defining the boundary quadrilaterals of the cavity by adjacency scanning of the inactive cells of the reservoir is used. A boundary quadrilateral is thus formed every time an inactive cell is adjacent to an active cell. It is then identified on the side separating these two cells. In parallel with this task, the topology of the sites is defined. A site internal to the cavity is then created when an inactive cell is adjacent to one or more active cells. The number of active cells shared by this site and the indices of the quadrilaterals formed by these cells are then stored. Similarly, the sites external to the cavity are created by considering the active cells adjacent to inactive cells.

This limited number of quadrangular sides which, on the one hand, belongs to the grids to be connected and, on the other hand, delimits the boundaries of the grid to be generated, have to be found as they are (neither modified nor divided) in the transition grid in order to obtain a conforming global grid. These quadrangular sides are referred to as constraint quadrilaterals.

Figure 4:
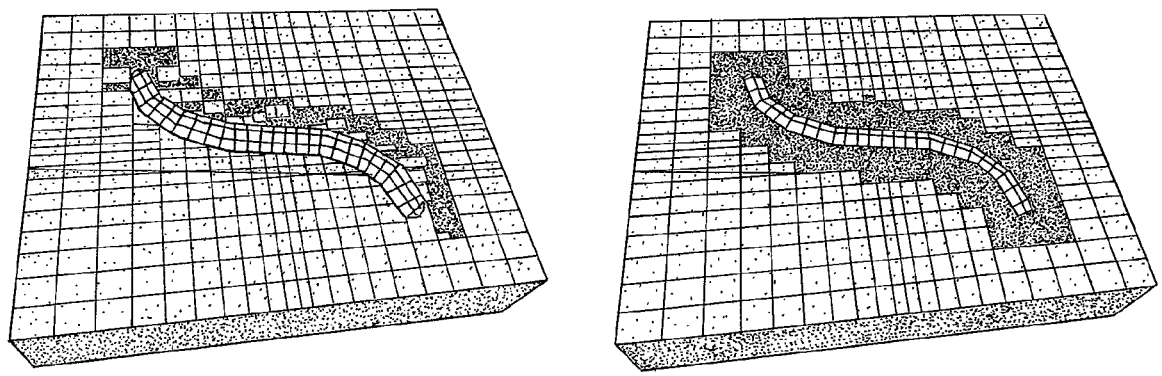
FIG. 4 illustrates a minimum cavity created by the method according to the invention, and the transition grid generated therein.

FIG. 4 illustrates a cavity obtained using this method, and the transition grid generated therein. It can be observed that the space created allows the transition grid to keep an intermediate cell size between the size of the well grid cells and that of the reservoir grid cells.

3. Automatic Generation of an Admissible Transition Grid

The next stage automatically constructs an unstructured grid resting exactly on the constraint quadrilaterals of the cavity, and whose elements meet the admissibility constraints in the finite volumes sense (conformity, convexity, orthogonality and self-centering constraints) so that the global hybrid grid is conforming. This unstructured grid must therefore have convex polyhedral cells resting on the quadrilaterals bordering the cavity.

The method is based on the construction of a regular triangulation.

This method can be broken up in form of a succession of 3 stages:

Definition of the sites;

Correction of the sites; and

Construction of the power diagram of the sites.

Definition of the Sites

The goal is here to define the position and the weight of the sites internal and external to the cavity so that the corresponding power diagram is in conformity with the boundary quadrilaterals of the cavity. Selection of the cavity sites requires very special care because the generation of a conforming, orthogonal and self-centered transition grid depends thereon.

FIRST EMBODIMENT

The Delaunay Triangulation

Figure 3A:
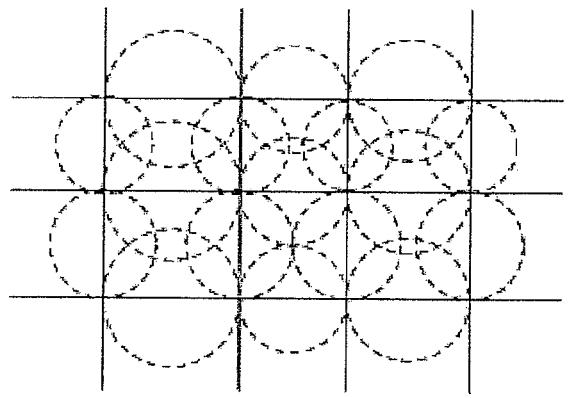
FIG. 3A illustrates the Delaunay admissibility of the reservoir grid.
Figure 3B:
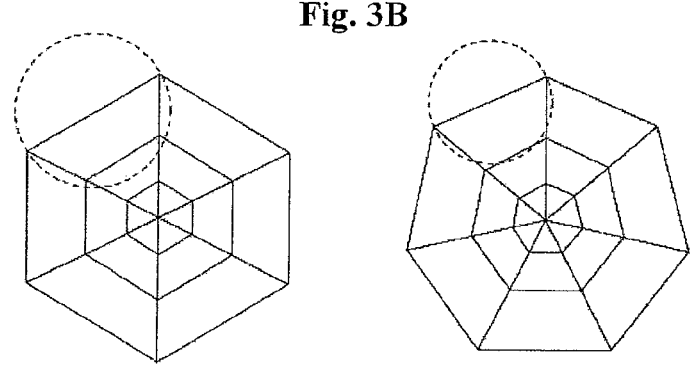
FIG. 3B illustrates, on the right, a Delaunay admissible well grid and, on the left, a non-Delaunay admissible well grid.

According to a first embodiment, the method is based on the construction of a Delaunay triangulation of the vertices of the cavity to define the sites of the cavity. This triangulation must be in accordance with the constraints of the cavity made up of quadrilaterals. It is therefore necessary to ensure that each side of the cavity is Delaunay admissible, that is the sides bordering the cavity belong to the Delautnay triangulation of the vertices of the cavity. The cavity is referred to as "Delaunay admissible" if the diametral sphere of each edge of the reservoir cells is empty for any vertex of the well and if the diametral sphere of each edge of the well cells is empty of any vertex of the reservoir (notion of Gabriel cavity). FIGS. 3A and 3B illustrate the Delaunay admissibility of the reservoir grid and of the well grid respectively. FIG. 3B illustrates, on the right, a Delaunay admissible grid and, on the left, a non Delaunay admissible grid. It can be noted that the definition of the cavity, as defined by the invention, ensures its Delatnay admissibility.

The Delaunay triangulation of the vertices of the cavity is carried out by means of a reduced incremental method, as described in the following book:

P. L. George and H. Borouchaki, "Triangulation de Delaunay et Maillage", Hermes, 1997.

This method triangulates first the box of the cavity in 5 tetrahedrons. Then, each point is inserted in the triangulation in an incremental way. A triangulation of the cavity envelope is then deduced therefrom by eliminating all the tetrahedrons at least one vertex of which is a vertex of the englobing box. The cavity being Delaunay admissible, the sides thereof (or more exactly the two triangles splitting each quadrangular side of the cavity) belong to tetrahedrons of this triangulation (maximum 4). The next stage consists in identifying them.

The second stage seeks the Delaunay tetrahedrons resting on the quadrilaterals of the cavity. Some definitions are necessary before addressing the method used:

Ball: Let P be a vertex of a grid, the ball associated with P is all the elements having P as the vertex.

Shell: Let e be an edge of a grid, the shell associated with e is all the elements sharing the edge.

A quadrilateral Q is defined by its four vertices: A, B, C and D. The tetrahedrons $T_{1in}$, $T_{2in}$, $T_{1out}$, $T_{2out}$ which rest on quadrilateral Q and which are respectively inside (in) and outside (out) the cavity are sought as follows:

1. Scanning the ball of vertex A to find a tetrahedron $T_0$ sharing edge [AB].
2. Scanning the shell of edge [AB] to find a tetrahedron $T_1$ sharing the triangular side (A, B, C) or (A, B, D). This triangular side is denoted by f, $e_A$ is the edge of f opposite vertex A and i the vertex of tetrahedron $T_1$ such that $i \notin f$.
3. If i is also a vertex of quadrilateral Q, the tetrahedron found is a sliver (tetrahedron of practically zero volume formed from four cocyclic points). In this case, the four tetrahedrons sought are the four tetrahedrons neighboring $T_1$: two of them are internal to the cavity and the two others are external thereto.
4. Otherwise, tetrahedron $T_1$ is one of the tetrahedrons sought: if $T_1$ is internal to the cavity, then $T_{1in}=T_1$, otherwise $T_{1out}=T_1$. Seeking tetrahedron $T_2$ neighboring $T_1$ and opposite vertex i then allows to determine the complementary tetrahedron:
   (a) If $T_2$ is a sliver, the four tetrahedrons sought are the four tetrahedrons neighboring $T_2$.
   (b) Otherwise, if $T_1$ was internal to the cavity, then $T_{1out}=T_2$, otherwise $T_{1in}=T_2$.
5. If 4.(b), the shell of edge $e_A$ is scanned to find a tetrahedron $T_3$ resting on the fourth vertex of quadrilateral Q.
6. If $T_3$ is a sliver, the tetrahedrons sought are the four tetrahedrons neighboring $T_3$.
7. Otherwise, tetrahedron $T_3$ is one of the tetrahedrons sought: if $T_3$ is internal to the cavity, then $T_{2in}=T_3$, otherwise $T_{2out}=T_3$. Seeking tetrahedron $T_4$ neighboring $T_3$ and opposite quadrilateral Q then allows to determine the complementary tetrahedron:
   (a) If $T_4$ is a sliver, the tetrahedrons sought are the four tetrahedrons neighboring $T_3$.
   (b) Otherwise, if $T_3$ was internal to the cavity, then $T_{2out}=T_4$, otherwise $T_{2in}=T_4$.

Figure 5A:
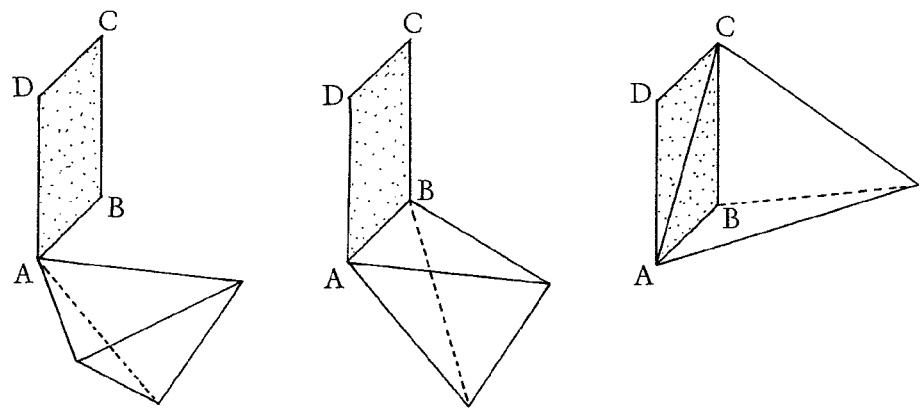
FIG. 5A illustrates steps 1 and 2 of the algorithm allowing finding the two tetrahedrons resting on side (A, B, C) of quadrilateral Q: seeking the $1^{st}$ tetrahedron resting on side (A, B, C) by scanning the ball of A, then the shell of [AB]
Figure 5B:
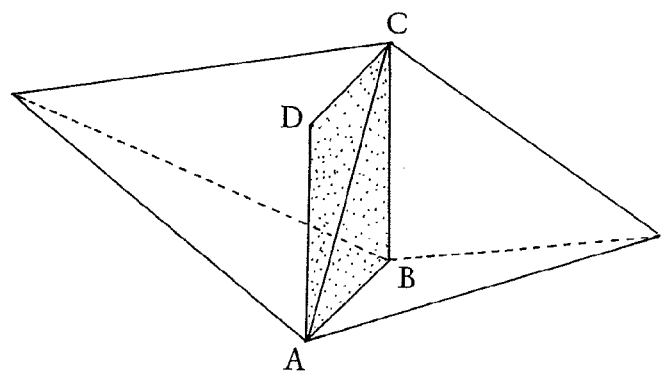
FIG. 5B illustrates Step 4b of the algorithm allowing to find the two tetrahedrons resting on side (A, B, C) of quadrilateral Q: seeking by adjacency the $2^{nd}$ tetrahedron resting on side (A, B, C)
Figure 5C:
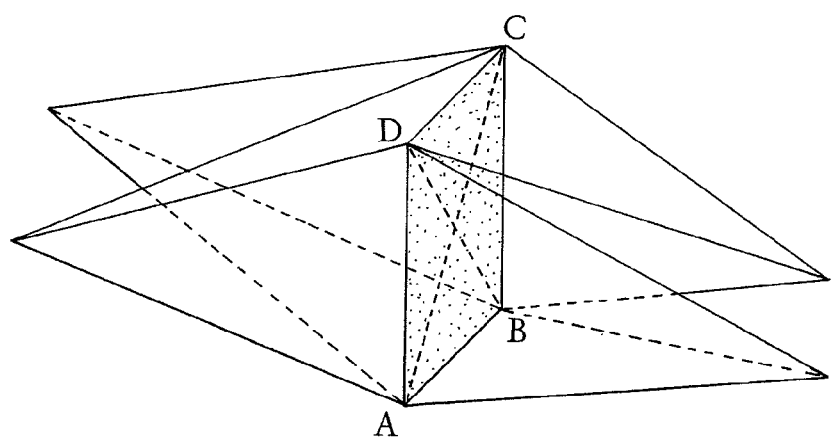
FIG. 5C illustrates the way the four tetrahedrons resting on quadrilateral Q are determined when a sliver has been detected.

FIGS. 5A and 5B illustrate the various stages of the algorithm allowing finding the two tetrahedrons resting on side (A, B, C) of quadrilateral Q. FIG. 5A illustrates stages 1 and 2, that is seeking the $1^{st}$ tetrahedron resting on side (A, B, C) by scanning the ball of A, then the shell of [AB]. FIG. 5B illustrates stage 4b: seeking by adjacency the $2^{nd}$ tetrahedron resting on side (A, B, C). Similarly, FIG. 5C illustrates the way the four tetrahedrons resting on quadrilateral Q are determined when a sliver has been detected.

Figure 6:
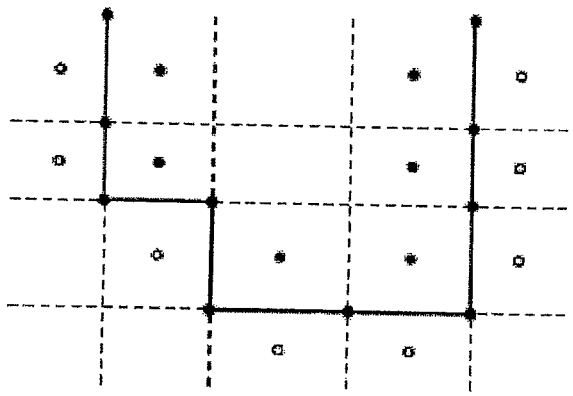
FIG. 6 illustrates the topology of the sites of the cavity.

Finally, after seeking the Delaunay tetrahedrons resting on the quadrilaterals of the cavity, the last stage of the construction of these sites defines the location of the sites, so that the corresponding power diagram is conforming. The method is based on the topology of the sites illustrated in FIG. 6: each site is shared by one or more quadrilaterals and each quadrilateral is shared by several tetrahedrons. The internal and external sites are selected quite differently:

A)—Locating the Internal sites

Let there be a site ρ internal to the cavity whose position is sought. Let $Q_{i=1 \ldots n}$ be the set of quadrilaterals shared by ρ and let M be the size of this set. The goal is to determine the space coordinates of ρ defined by point P(x,y,z), and its weight ω for the transition grid obtained to be conforming.

Determination of P(x,y,z)

There are two cases for determining P(x,y,z): either site ρ is shared by a single quadrilateral, or it is shared by several quadrilaterals (maximum four). The value of n is then discussed:

if n>1, calculation of P is very fast: P is identified at V, the Voronoi site associated with quadrilaterals $Q_{i=1 \ldots n}$, which is the only intersection point of the dual edges of $Q_{i=1 \ldots n}$. The Voronoi diagram being the dual of the Delaunay triangulation, V is obtained by calculating the barycenter of the centers of the spheres circumscribed about the m tetrahedrons resting on quadrilaterals $Q_{i=1 \ldots n}$:

$$V = \frac{\sum_{i=1}^{m} O_i}{m}$$

where the $O_i$ are the centers of the spheres circumscribed about these tetrahedrons;

if n=1, calculation of P is slightly more complicated: P is determined by calculating the midpoint of segment [OV], O being the center of the circle circumscribed about the quadrilateral associated with ρ. By experience, it is noted that this position gives good results. The center of the circle circumscribed about a quadrilateral Q is the point located at an equal distance from the vertices of Q. If Q is cocyclic and rectangular, the center of its circumscribed circle is given by the barycenter of its vertices. On the other hand, if Q is any quadrilateral (which occurs when the well is deflected), the center of its circumscribed circle is approximated; it is then given by the relation:

$$O = \frac{O_{ABC} + O_{BCD} + O_{ABD} + O_{BDC}}{4}$$

where A, B, C and D are the vertices of the quadrilateral and $O_{ABC}$, $O_{BCD}$, $O_{ABD}$ and $O_{BDC}$ are the centers of the circles circumscribed about the corresponding triangles.

In practice, only this formula is used insofar as it remains valid in the case where Q is cocyclic and rectangular.

Figure 7:
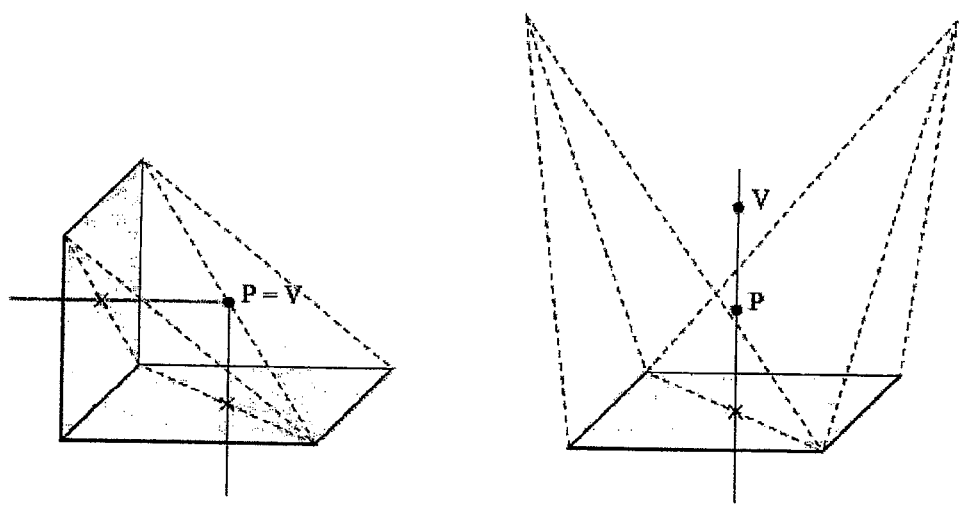
FIG. 7 illustrates the determination of the position of a site in the case where the number of quadrilaterals shared by this site is 2 (left) and 1 (right)

FIG. 7 illustrates the determination of points P(x,y,z) in these two cases: in the case where the number of quadrilaterals shared by a site is 2, determination of the position of this site is illustrated on the left and in the case where this number is 1, determination of the position is illustrated on the right.

Determination of ω

Weight ω represents the radius of the sphere of center P passing through its constraint vertices $A_{i=1 \ldots s}$. Thus, if the constraint quadrilaterals associated with ρ are cocyclic, P is located exactly at an equal distance from its constraint vertices; ω is then defined exactly by calculating the distance from P to constraint vertex $A_1$. On the other hand, in the opposite case, ω has to be approximated; it is then determined by calculating the mean distance from P to its s constraint vertices:

$$\omega = \frac{\sum_{i=1}^{s} \|\vec{PA}_i\|}{s}$$

In practice, only this formula is used insofar as it remains valid in all cases.

Figure 8:
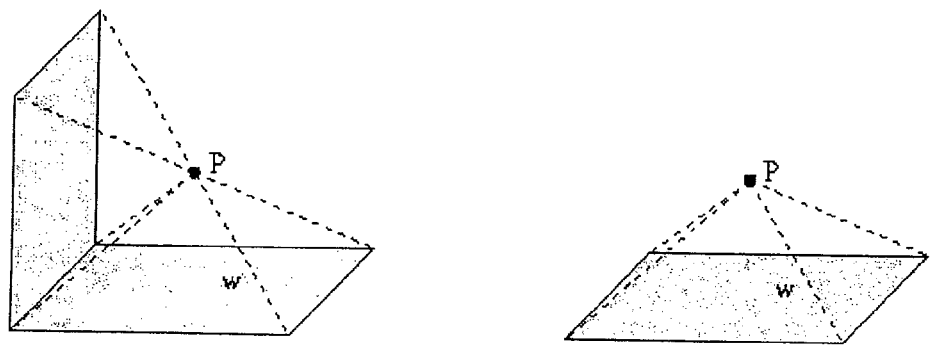
FIG. 8 illustrates the determination of the weight ω of a site in the case where the number of quadrilaterals shared by this site is 2 (left) and 1 (right)

FIG. 8 illustrates the determination of weight ω in the case where the site shares two constraint quadrilaterals on the left and only one on the right.

B)—Locating the External Sites

The method used to determine the sites external to the cavity is somewhat different from the method described above. In fact, if the number of quadrilaterals shared by the site is one, this quadrilateral may be located on the convex envelope of the cavity. In this case, no tetrahedron of the Delaunay triangulation rests on the external side of the quadrilateral. The external site is then obtained by symmetry of the internal site with respect to the center of the circle circumscribed about the quadrilateral:

$$\begin{cases} P = P' + 2\vec{P'O}, \\ \omega = \omega' \end{cases}$$

where (P,ω) is the external site, (P',ω') is the site internal to the cavity and O is the center of the circle circumscribed about the quadrilateral.

In all the other situations, the method described for locating the internal sites remains valid.

SECOND EMBODIMENT

Barycenter or Center of the Sphere Circumscribed about a Hexahedron

In the first embodiment, a Delaunay triangulation of the vertices of the cavity is used to position the sites required for construction of a conforming power diagram between the well and reservoir grids. The sites are defined on the dual edges of the sides of the cavity, so that they are located at an equal distance from the vertices of the associated quadrilateral sides. This distance is different for each site and it is a function of the space present between the boundary of the well and that of the reservoir, which is given locally by the simplexes of the triangulation.

However, the size of the cavity being known and controlled, each site of the cavity can be directly defined in such a way that the distance between a site and each vertex of the associated constraint sides is the same. The method benefits from the size of the cavity:

A)—Determination of P(x,y,z)

Selection of the Sites Associated with the Reservoir

Let $S_R$ be all the cells of the reservoir grid sharing at least one side with the boundary of the cavity, then:

for each inactive cell $S_R$, a site internal to the cavity is defined, which is the barycenter or the center of the sphere circumscribed around this cell; and for each active cell $S_R$, a site external to the cavity is defined, which is the barycenter or the center of the sphere circumscribed around this cell.

Selection of the Sites Associated with the Well

Figure 17:
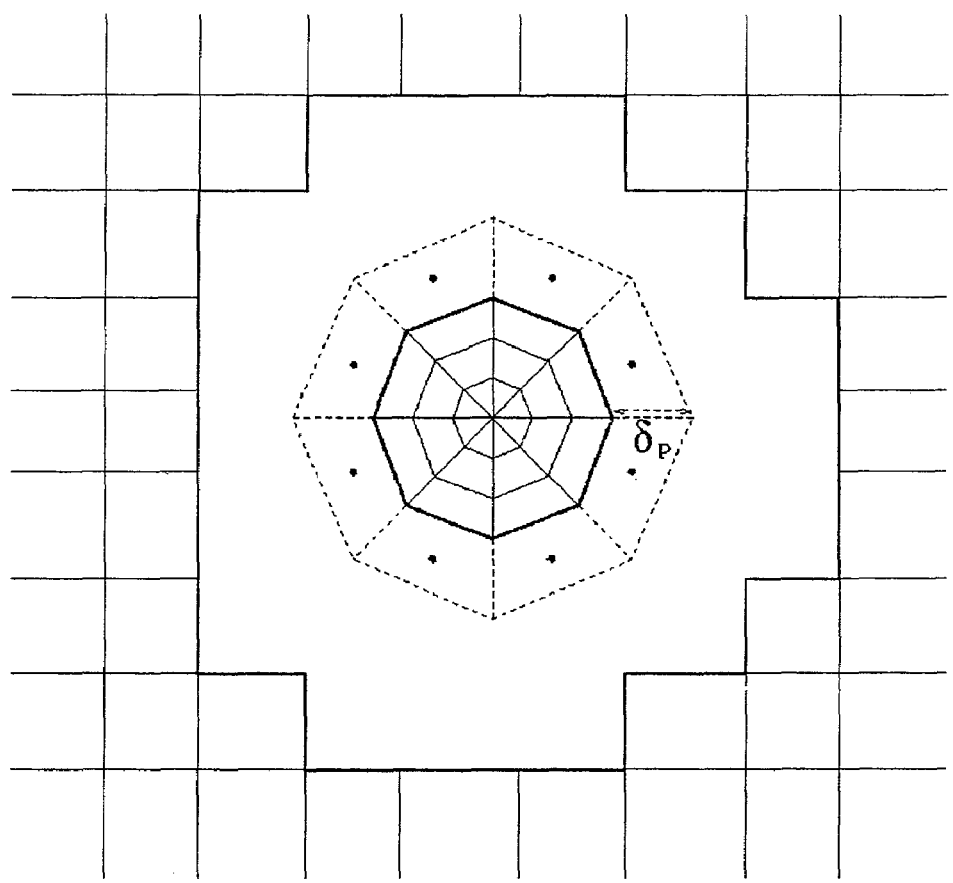
FIG. 17 illustrates the construction of a virtual cell around a well to define the sites internal to the cavity.

A similar procedure is used here. Let therefore $S_P$ be all the cells of the well grid sharing at least one side with the boundary of the cavity, then, for each active cell of $S_P$:

a site external to the cavity is defined, which is the barycenter or the center of the sphere circumscribed around this cell; and a virtual cell is constructed by adding around the well a layer of additional cells of size $\delta_{Well}$, where $\delta_{Well}$ is the local edge size of the well. A site internal to the cavity is then defined by the barycenter or the center of the sphere circumscribed around this virtual cell (FIG. 17).

Gathering of the Sites

The set of sites necessary for construction of the power diagram is obtained by gathering all the sites internal and external to the cavity defined at the reservoir and at the well level. The sites internal to the cavity will be the centers of the cells of the power diagram and the sites external to the cavity will allow assurance of their conformity with the boundary of the cavity.

B)—Determination of ω

It can be noted that each site (internal or external) is associated with one or more sides of the cavity referred to as constraint side(s) associated with the site, and that each side of the cavity is always associated with two sites: a site internal and a site external to the cavity. Besides, the weight a) of each site (P,ω) is equal to the mean distance from P to the vertices of its constraint side(s).

The barycenter of the circumscribed sphere is calculated by summation of the eight vertices of the hexahedral cell which is considered. For the center, calculation is more complex and a method for defining these centers is proposed hereafter.

C)—Evaluation of the Center of the Sphere Circumscribed Around a Hexahedron

There the definition of the center of the sphere circumscribed around any hexahedral cell is described by means of a distance calculation and by solving the associated linear system, by an approximation using least squares (the center of the sphere circumscribed around a parallelepipedic hexahedral cell being equal to the midpoint of one of the large diagonals of the cell).

Let $P_i$ (i=1 ... 8) be the 8 vertices of any hexahedral cell. The sphere of center P passing the closest to the 8 vertices of this cell.

By expressing the distance between P and $P_1$ and by imposing that this distance must be equal to that between P and each one of the other 7 vertices $P_i$ (i=2 ... 8), the following relation is obtained:

$$\|\vec{PP_1}\| = \|\vec{PP_i}\|$$

$$\sqrt{\vec{PP_1} \cdot \vec{PP_1}} = \sqrt{\vec{PP_i} \cdot \vec{PP_i}}$$

or, by developing and by squaring:

$$(x_i - x_1)x + (y_i - y_1)y + (z_i - z_1)z = \frac{(x_i^2 - x_1^2) + (z_i^2 - z_1^2) + (z_i^2 - z_1^2)}{2}$$

with the notations $$P_i = \begin{pmatrix} x_i \\ y_i \\ z_i \end{pmatrix} \text{ and } P = \begin{pmatrix} x \\ y \\ z \end{pmatrix}.$$

An overdetermined system of the form as follows is obtained:

$$A \cdot P = B$$

where A is a (7×3) matrix function of $(x_i, y_i, z_i)$ and B is a 7-row vector:

$$A = \begin{pmatrix} (x_2 - x_1)x & (y_2 - y_1)y & (z_2 - z_1)z \\ \vdots & \vdots & \vdots \\ (x_8 - x_1)x & (y_8 - y_1)y & (z_8 - z_1)z \end{pmatrix}$$

$$B = \frac{1}{2} \begin{pmatrix} (x_2^2 - x_1^2) + (y_2^2 - y_1^2) + (z_2^2 - z_1^2) \\ \vdots \\ (x_8^2 - x_1^2) + (y_8^2 - y_1^2) + (z_8^2 - z_1^2) \end{pmatrix}$$

To solve this overdetermined system and try to satisfy all the equations simultaneously (which is impossible in the general case), an approximation is used using least squares that is minimizing the difference between vectors A·P and B of $\mathfrak{R}^6$ by minimizing the square of the Euclidean norm of their difference. The general formula for approximating solution obtains a well-determined system (of 3 equations in 3 unknowns) by multiplying the previous expression on the left by $^tA$:

$$^tA \cdot A \cdot P = {}^tA \cdot B$$

This system is then solved by means of a conventional method, for example the Gaussian pivot method. The point P thus found is the center of the sphere passing the closest to the 8 vertices of the hexahedral cell which is considered.

D)—Adjustment of the Sites

Each site constructed from any hexahedral cell is the barycenter or the center of the sphere passing the closest to the 8 vertices of this cell. Its distance in relation to these 8 vertices is therefore not the same, which may in some cases pose significant conformity problems. Now, it is known that each site is associated with one or more sides of the cavity and that, in order to be conforming, it has to be located at an equal distance from the vertices (4 to 8 in number) of this or these side(s). It is therefore proposed to move iteratively this site in space so as to minimize the maximum difference between the distances from this site to each one of these constraint vertices.

Let (P, ω) be a given site and $P_1$, $P_2$, $P_3$ and $P_4$ the vertices of the associated quadrilateral side, the "move" algorithm consists in:

1. Calculating the mean distance $l_{moy}$ from P to each vertex $P_i$:

$$l_{moy} = \frac{\sum_{i=1}^{4} \| \overrightarrow{P_i P} \|}{4}$$

2. Defining point Q of coordinates $x_Q$, $y_Q$ and $z_Q$, such that:

$$Q = \frac{\sum_{i=1}^{4} \left( P_i + l_{moy} \frac{\overrightarrow{P_i P}}{\| \overrightarrow{P_i P} \|} \right)}{4}$$

3. If Q is different from P (i.e. if $|x_Q - x| > \in$ or $|y_Q - y| > \in$ or $|z_Q - z| > \in$ where $\in$ is the desired accuracy), replace P by Q and go to 2.

At algorithm convergence, site (P, ω) has reached a position of equilibrium. By replacing P by point Q and by defining ω as the mean distance from P to each vertex $P_i$, the conformity problems dealt with below are minimized further.

Site Correction

The second stage of the automatic construction of the transition grid corrects the position of certain sites via correction of their weight, in order to guarantee that the cells of the power diagram of the sites are non-empty and self-centered cells. The mutual interaction of the sites is therefore considered and an algorithm referred to as "correction" algorithm is proposed.

A set of sites internal and external to the cavity guaranteeing the existence of a power diagram in conformity with the constraint quadrilaterals has been defined. However, although such a diagram satisfies the orthogonality and convexity conditions relative to the finite volumes, it cannot be ensured that each cell is non-empty and self-centered. In fact, a site can be outside its cell or, which is more serious, a site may have no cell. This is due to the definition of the sites that was made independently. Each site is determined as a function of its constraint quadrilaterals without taking account of its interaction with the other sites. Now, to guarantee the construction of a power diagram of non-empty cells and self-centered, this mutual interaction of the sites must be taken into account.

The geometric condition expressing that two sites are admissible in the finite volumes sense can be defined as follows: let there be two sites ($P_i$, $\omega_i$) and ($P_j$, $\omega_j$) and let $\Gamma_{ij}$ be their radical plane, that is the locus of equal power of $P_i$ and $P_j$. The geometric condition expressing that these two sites are located on either side of $\Gamma_{ij}$ and thus that the cells of the power diagram resulting therefrom are self-centered can be expressed as follows:

$$|\omega_i^2 - \omega_j^2| \leq \|\overrightarrow{P_i P_j}\|^2$$

This condition is the necessary and sufficient condition expressing that radical plane $\Gamma_{ij}$ intersects segment $[P_i P_j]$.

Figure 9:
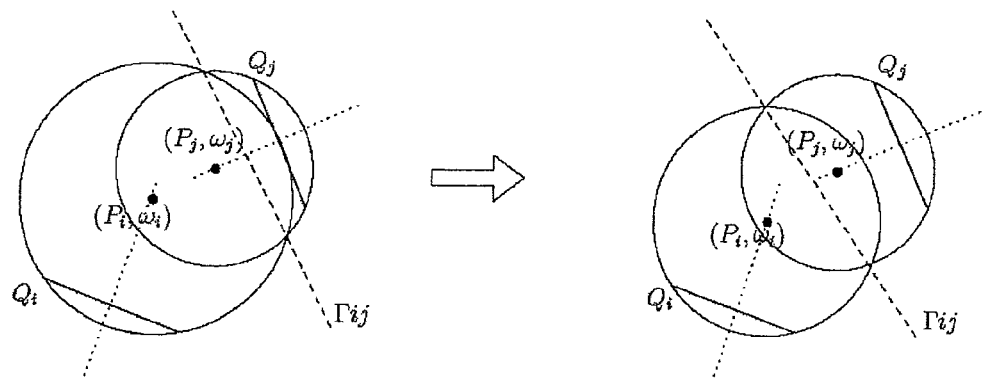
FIG. 9 illustrates the displacement of a radical plane by displacement of a site and modification of its weight.

The correction of two non admissible sites in the finite volumes sense can be considered in two different ways. The first one modifies the weight of one of the sites, that is in modifying the radius of the circle associated with this site. The second possibility allows the radical plane to be displaced simply by displacing the site. In fact, displacement of a site modifies the position of the intersection of the spheres associated with the sites and therefore the position of the radical plane. However, the weight of a site is linked with its position. In fact, the weight ω of a site, located at point P, is such that ω corresponds to the mean distance between P and the ends of the constraint quadrilateral(s) associated with the site. The power of a site can therefore not be modified without being displaced, and conversely. The method according to the invention uses a combination of these two procedures (FIG. 9):

Let there be two sites $\rho_i(P_i, \omega_i)$ and $\rho_j(P_j, \omega_j)$ located on the same side of their radical plane $\Gamma_{ij}$. For radical plane $\Gamma_{ij}$ to be located between sites $\rho_i$ and $\rho_j$, the position of one of the two sites is modified. In practice, the site whose weight is maximum, for example $\rho_i$ (FIG. 9), is displaced along its dual edge and moved closer to its constraint quadrilateral until radical plane $\Gamma_{ij}$ is located between sites $\rho_i$ and $\rho_j$.

The algorithm for correcting the set of sites is iterative and includes:

1. Initializing the number of corrections n to zero;
2. For each site of the cavity $(P_i, \omega_i)$, seeking the set of sites $(P_j, \omega_j)$, $j \neq i$, such that $\|\overrightarrow{P_iP_j}\|^2 \leq \omega_i^2$ using a bucket sorting procedure; and
3. For each pair of sites $((P_i, \omega_i), (P_j, \omega_j))$, calculating difference $|\omega_i^2 - \omega_j^2|^2$. If this difference is greater than $\|\overrightarrow{P_iP_j}\|^2$, the radical plane is not located between $P_i$ and $P_j$; a correction is thus required (n is incremented). If denoted by $(P, \omega)$ the site having the maximum weight, the correction displaces P along its dual edge by drawing it closer to its constraint quadrilateral by a distance of 10% ($\omega$ being updated at the same time).
4. If n>0, returning to 1.

At the end of this algorithm, each site of the cavity has been tested at least once with neighboring sites and some of them have been corrected. The new spatial configuration of the sites is now admissible in the finite volumes sense and the associated power diagram is self-centered.

Construction of the Power Diagram of the Sites

The third and last stage of the automatic construction of the transition grid constructs the power diagram of the sites of the cavity. The set of sites internal and external to the cavity has been defined so as to guarantee the theoretical existence of an orthogonal and self-centered power diagram.

Generation of this power diagram is based on the 3D regular triangulation of all the sites of the cavity by means of a reduced incremental method.

Figure 10A:
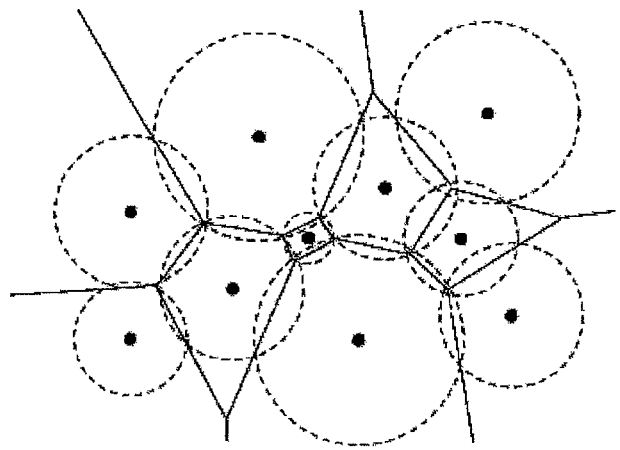
FIG. 10A illustrates the 2D power diagram obtained from a regular triangulation (FIG. 10B)
Figure 10B:
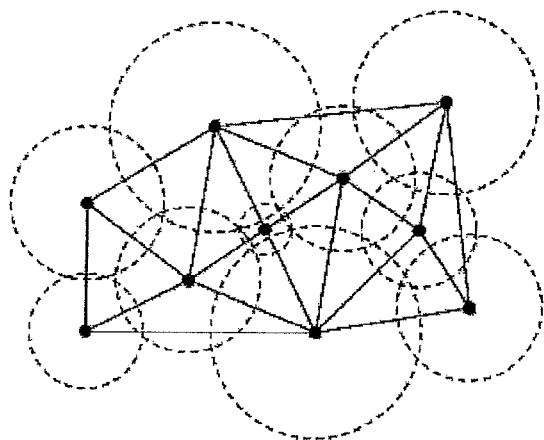
FIG. 10B illustrates a regular triangulation.

From the tetrahedrons obtained from regular triangulation of the sites, the dual can be constricted to thus form the desired power diagram. In particular, the fact that the sides of the cells have a power with respect to the two sites they separate is used to define the radical planes of the triangulation edges. In other words, the desired power diagram (or more exactly the sides thereof) is obtained by joining the power centers of the tetrahedrons belonging to the shell of an edge. This is illustrated by FIGS. 10A, 10B and 10C. FIG. 10A illustrates the 2D power diagram resulting from the regular triangulation of FIG. 10B. FIG. 10C illustrates the generation of one side of the power diagram using the duality with the regular triangulation.

The transition grid to be generated being restricted to the space portion delimited by the cavity, only the power cells of the sites internal to the cavity are constructed.

The orthogonal self-centered power diagram is theoretically in conformity with the constraint quadrilaterals (if the latter are cospherical and coplanar). However, due to numerical imprecisions and to the presence of certain non-cocyclic quadrilaterals at the boundary of the deflected wells, this conformity is not ensured. It is therefore necessary to carry out an additional stage referred to as "correction" stage to make each cell of the transition grid conforming.

Since non-conformity problems can be of different natures (numerical errors during calculation of the coordinates of the vertices, presence of "parasitic" vertices or sides), the method uses two techniques for carrying out correction of the power diagram in order to ensure its conformity:

According to a first embodiment, the method comprises an efficient and robust algorithm for modifying the transition cells that are created. Let there be a cell of the transition grid V, let $\rho$ be the associated site, and let $Q=\{Q_1 \ldots Q_n\}$ be the set of constraint quadrilaterals shared by $\rho$. The algorithm modifying the sides and the vertices of cell V so that V becomes Q-conforming is as follows:

If $S_C = \{S_1 \ldots S_m\}$ is the set of vertices of the constraint quadrilaterals associated with V:

1. The set of sides of cell V is scanned and $P_F = \{P_1 \ldots P_q\}$ is determined as the sum of the vertices of the boundary sides (a boundary side is a side shared by only one transition cell) of V;
2. For each vertex $P \in P_F$, the closest constraint vertex S is determined:

$$S = \{S_i \in S_C, \|\overrightarrow{PS_i}\| \geq \|\overrightarrow{PS_j}\|, \forall S_j \in S_C, j \neq i\}$$

and P is replaced by S using a reference table. Substitution of a vertex for another one involving any number of sides and of transition cells (transition grid cell), a reference table is used to propagate the changes to all these entities. A table of integers Tref(1:N) where N is the number of vertices of the transition grid which is constructed. This table is initialized by: Tref(i)←i, $\forall i$. Thus, to substitute the vertex of index $p_0$ by the vertex of index $p_1$, we write Tref $(p_0) \leftarrow p_1$. The new modified cells are then obtained when reading the sides where the references of the vertices have to be taken rather than their indices.

By applying this algorithm to all of the cells of the transition grid, then by updating all of the data structure (removal of the multiple points present in a side and removal of the sides whose vertex number is below 3), a 100% conforming transition grid is obtained.

FIG. 11 illustrates an example of a transition cell made conforming by removal of 5 vertices and 3 sides.

Figure 18:
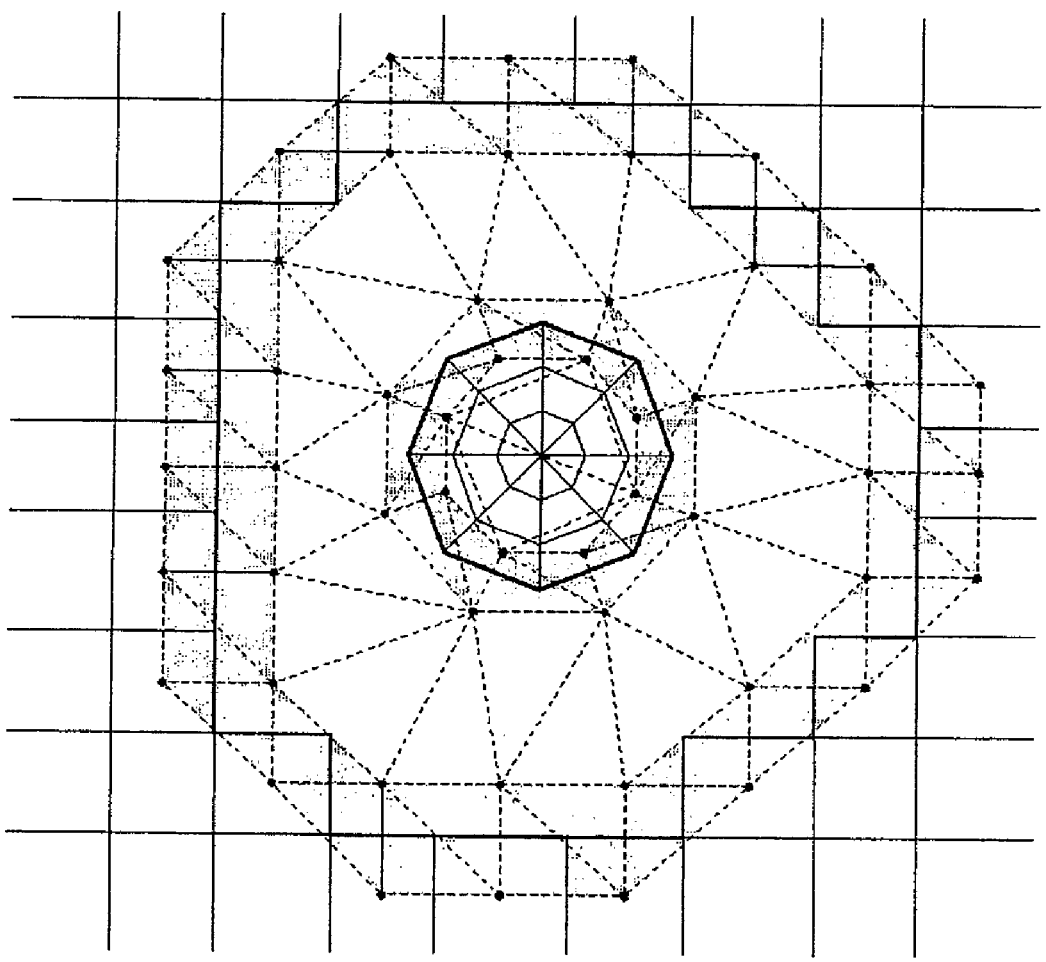
FIG. 18 illustrates the principle according to which the vertices of the cavity are obtained by the tetrahedrons of the regular triangulation, made up of sites internal and external to the cavity.

According to a second embodiment, the method allows settling the conformity problems during construction of the power diagram of the sites internal to the cavity. The principle is based on the fact that the vertices of the cavity are obtained by the tetrahedrons of the regular triangulation made up of sites internal and external to the cavity (FIG. 18).

During constriction of the power diagram, the centers of the power spheres of these tetrahedrons can therefore be directly replaced by the vertices of the cavity, which avoids the aforementioned numerical errors. To identify these vertices, the topological notions established between the sites and the quadrilaterals of the cavity are used: each quadrilateral is associated with two sites (an internal site and an external site) and each site is associated with one (or more) quadrilateral(s).

More precisely, for each tetrahedron i of the regular triangulation, the number of vertices which are sites internal to the cavity are counted. If this number of vertices ranges between 1 and 3 (that is the tetrahedron has sites internal and external to the cavity), the index e of the vertex of the cavity which is common to the quadrilaterals associated with the four sites forming the tetrahedron in question is sought. The center of the circumscribed sphere of tetrahedron i is then replaced by the vertex of the cavity of index e.

The following algorithm allows these substitutions to be carried out:

Let nk be the number of tetrahedrons of the regular triangulation of the sites of the cavity and let Link(1:nk) be a table initialized at 0. The following procedure allows to replacing the centers of the power spheres of certain tetrahedrons of the regular triangulation by the vertices of the cavity by modifying Table Link:

Procedure: RepTaceCentersTetrahedrons( )
for i=1 to nk do
  let n=0;
  for j=1 to 4 do
  if vertex j of tetrahedron i is a site internal to the cavity do n=n+1;

end if
  end for
  if 1≦n≦3 do
  let e be the index of the vertex of the cavity that is common to the quadrilaterals of the cavity associated with the 4 sites forming tetrahedron i;
  Link(i)=e
  end if end for As a result, the center of the sphere circumscribed around each tetrahedron is given by Table Link. In particular, if Link(i)=0, then the center of the power sphere of tetrahedron i is equal to itself. Or, if Link(i)=e (with e>0), the center of the power sphere of tetrahedron i is equal to vertex e of the cavity. The center of the circumscribed sphere of tetrahedron i is then replaced by the vertex of the cavity of index e using Table Link.

It should be noted that the degenerated cases where the wells are very greatly deflected, the quadrilaterals associated with the four sites forming a given tetrahedron may not all have a common vertex. In this case, the center of the power sphere of the tetrahedron in question is replaced by the index of the closest vertex of these quadrilaterals.

Construction of the power diagram of the sites internal to the cavity is then done via the construction method described above using Table Link when accessing the center of the sphere circumscribed around a tetrahedron. This requires a dynamic coloring table to prevent a vertex from appearing several times in a single side and to check that each side has at least three different vertices before it is constructed.

4. Optimization of the Quality Criteria of the Transition Grid Under Quality and Validity Control in the Finite Volumes Sense Optimization of a grid from the viewpoint of a certain criterion is an operation that is widely performed, with different objectives. The applications of such a grid optimization are in fact numerous. In particular, optimization as such is interesting because the quality (convergence of the schemes, result accuracy) of the numerical solutions associated with the nodes of a grid obviously depends on the quality thereof. The grid generation method according to the invention therefore comprises, at the end of the procedure, an optimization stage that improves the grid quality.

Definition of the Quality Criteria of the Hybrid Grid

In the literature, there are many criteria for measuring the quality of a triangle or of a tetrahedron, but there is none really suited to measure the quality of polyhedral cells. Three criteria allowing the quality of the transition grid to be measured are defined within the scope of the invention:

a shape quality criterion $Q_F$

The first quality measurement $Q_F$ of a cell V is given by:

$$Q_F(V) = \min_{i=1,n}\left(\frac{l_i}{h}, \frac{h}{l_i}\right)$$

where n is the number of edges, $l_i$ is the length of the i-th edge of the cell and h is the reference length associated with V. This length h is equal to the average length of the constraint edges associated with V. These constraint edges are the edges of the constraint quadrilaterals shared by V. This quality perfectly measures the shape or the aspect of the element as a function of the reference sizes of the reservoir and of the well. It can be noted that its value can range from 0, the degenerated cell having a zero edge, to 1, the regular polyhedral cell.

an orthogonality criterion $Q_O$

This criterion allows measuring of the orthogonality of the transition grid by calculating the angle (in degrees) defined between the segment connecting the sites of two neighboring cells and the plane delimited by their common side. If F is a polygonal side, the measurement of its orthogonality $Q_O$ is given by:

$$Q_O(F) = \arcsin\left|\overrightarrow{P_1P_2}.\vec{n}\right| * \frac{180}{\pi}$$

where n is the normal to the side and $P_1$ and $P_2$ are the sites of the two cells located on either side of F. It can be noted that $Q_O$ ranges from 0° for a degenerated cell to 90° for a perfectly orthogonal cell. The orthogonality $Q_O$ of a cell V is then defined by the minimum orthogonality of its sides, it is expressed by:

$$Q_O(V) = \min_{F \in V} Q_O(F)$$

a planarity criterion $Q_P$

This specific 3D criterion is used to measure the planarity of the sides of the transition grid.

Let F be the side defined by vertices $\{A_1 \ldots A_{ns}\}$ and let G be the barycenter of this side. If F is split into ns triangles $T_i=(G,A_i,A_{i+1})_{i=1\ldots ns}$, the measurement of its planarity $Q_P$ (in degrees) is given by:

$$Q_P(F) = \max_{i=1\ldots ns}\left(ar\cos\left|\vec{n}.\vec{n_{Ti}}\right| * \frac{180}{\pi}\right)$$

where $\vec{n}$ is the normal to the side and $\vec{n_{Ti}}$ is the normal to triangle $T_i$.

It can be noted that $Q_P$ ranges from 0° for a perfectly plane side to 90° for a degenerated side. The planarity $Q_P$ of a transition cell V is then defined by the maximum planarity of its sides, it is expressed by:

$$Q_P(V) = \max_{F \in V} Q_P(V)$$

Optimization of the Transition Grid

The hybrid grids generated by means of the method of the invention comprise in most cases very small edges and very small sides (due to numerical problems when an edge is generated by joining two vertices instead of one or, more generally, to problems inherent in the power diagrams), which gives numerical results of bad quality. Removal of the small sides being very difficult, the optimization method eliminate the small edges of the transition grid under fixed quality controls (the small sides are then removed implicitly). Since this optimization can be carried out to the detriment of other criteria (orthogonality, planarity), three controls are introduced allowing validation of the removal of an edge in the finite volumes sense:

an orthogonality control: a transition cell is referred to as orthogonal if its orthogonality $Q_O$ is greater than or equal to a given threshold $\Omega_1$, fixed by default, specified by the user or resulting from a calculation;

a planarity control: a transition cell is referred to as planar if its planarity $Q_P$ is less than or equal to a given threshold $\Omega_2$, fixed by default, specified by the user or resulting from a calculation;

a self-centering control: a cell is referred to as self-centered if its site is within it.

In order to improve the quality of the transition grid, two optimization stages, that may be complementary, are used.

The first optimization stage eliminates the small edges of the transition grid under quality, orthogonality, planarity and self-centering control. This elimination first removes a maximum amount of small edges. This operation replaces an edge [AB] by a point c by reconnecting the latter to all the vertices to which the edge was connected. This operation always leads to an improved shape quality of the cells. Then, insofar as some small edges cannot be eliminated under quality and validity control in the finite volumes sense, an additional stage is then applied: elimination then expands the edges that could not be eliminated. The methodology selected increases the size of the small edges to improve the size quality of the transition grid. However, since expansion of an edge [AB] can be done to the detriment of the size of the other edges incident to A or B, it is ensured that expansion of an edge is accompanied by a local improvement in the shape quality of the cells. Since modifying an edge leads to a degradation of the orthogonality and of the planarity of the surrounding cells, the procedure used is iterative and modifies first the very small edges up to a threshold fixed by default, specified by the user or resulting from a calculation.

Numerical simulations being of higher quality when the sites of the cells merge with their center of mass, a second optimization stage is performed. It displaces the sites of the cells towards their center, under orthogonality control. This change is performed by means of an iterative procedure displacing step by step all of the sites at each iteration, so as to avoid too sudden a motion of the sites.

FIG. 12A illustrates a transition grid before optimization and FIG. 12B shows the same grid after optimization.

Figure 13:
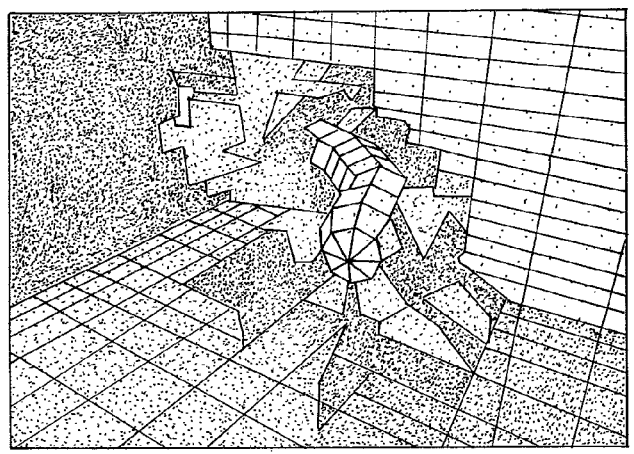
FIG. 13 illustrates a transition grid obtained according to the method of the invention.

FIG. 13 illustrates a transition grid obtained by means of the method,

5. Results

The method according to the invention allows generation and to optimize 3D hybrid grids has been presented and illustrated. This part is devoted to the presentation of results obtained by means of the method. These results are illustrated by a series of 3D hybrid grids obtained for various configurations.

Case of Rectilinear Wells

Figure 14:
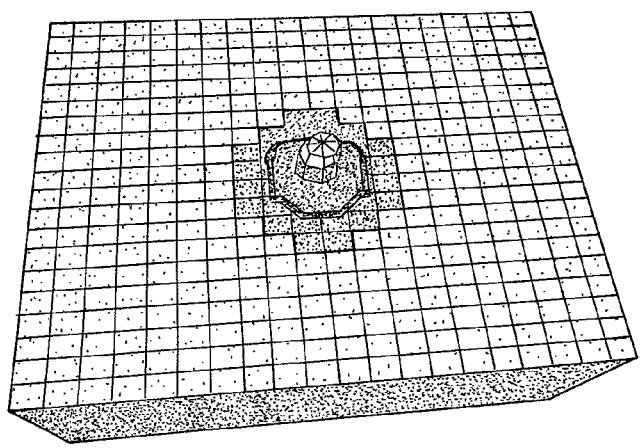
FIG. 14 illustrates the result of a hybrid grid generated from a uniform grid and a vertical well.

A vertical well of circular radial structure is inserted in a reservoir grid of uniform Cartesian type. The result obtained is illustrated by FIG. 14. In this case, due to the regularity of the reservoir grid, the ring-shaped structure of the transition grid is particularly visible.

The only restriction imposed on the position of the well in the reservoir is not to choose a location too close to the edge of the reservoir. In fact, in this case, it would not be possible to define a cavity and to create a transition grid. However, geometrically, if necessary, the reservoir could be extended artificially and the cavity could be created overlapping the reservoir and its extension.

Case of a Group of Wells

Figure 15:
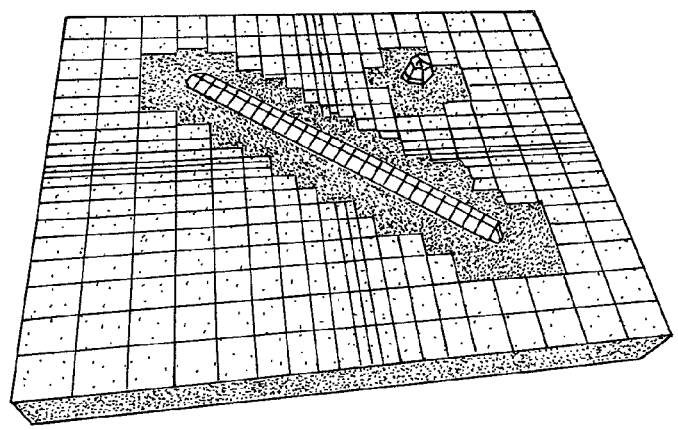
FIG. 15 illustrates the result of a hybrid grid generated from a non-uniform grid, a vertical well and an inclined well, by creating two cavities and therefore two transition grids.

So far, a single isolated well was inserted in the reservoir grid. However, the method allows accounting for wells simultaneously, including deflected wells. Insertion of a group of wells in a reservoir can be considered in two different ways. The first one inserts wells remote from one another. In this case, a cavity is defined for each well, as illustrated by FIG. 15.

Figure 16:
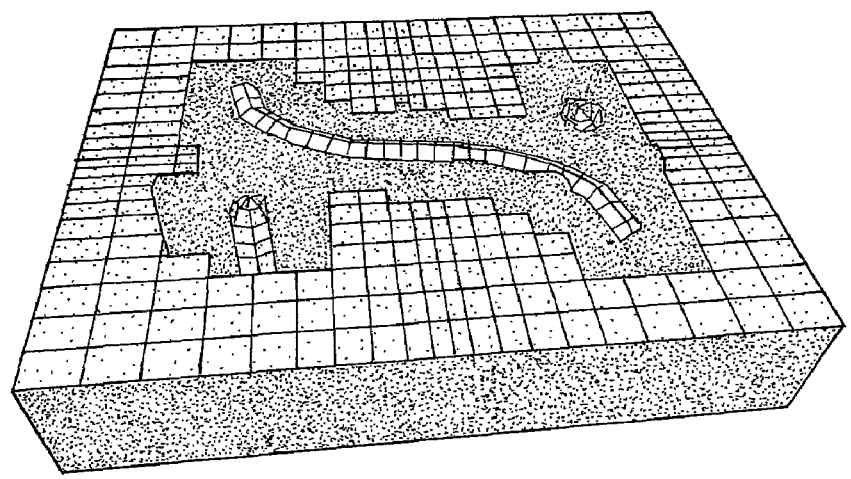
FIG. 16 illustrates the result of a hybrid grid generated from a non-uniform grid, two vertical wells and a deflected well, by creating two cavities and therefore two transition grids.

The second way of inserting a group of wells in a reservoir takes them sufficiently close to one another so as to define only one cavity around these wells. In this case, the method applies and differs only in the presence of several boundary polyhedrons within a boundary polyhedron delimiting the outer edges of the cavity. FIG. 16 illustrates the case of a hybrid grid where the transition grid simultaneously connects two well grids and one reservoir grid.

FIG. 16 also illustrates the case of a hybrid grid generated from a reservoir of non-uniform Cartesian type and three wells: a vertical, a deflected and an inclined well.

The case has been considered where the two structured grids were of radial type and formed around wells running through the medium, with delimitation of cavities around each second grid so as to include a transition grid. It is however clear that the method applies to gridding of a medium exhibiting other types of geometric discontinuities such as, for example, an underground reservoir crossed by fractures or channels. In this case, the second structured grids can be of CPG type for example.

The method according to the invention allows inserting one or more well grids in a single reservoir grid. Thus, when two or more wells are very close, the corresponding cavities can merge and give rise to a single transition grid.

Furthermore, when the space between two well grids is not sufficient to construct a conforming transition grid, some cells of these well grids are deactivated to increase the size of the cavity whose size must then be greater than or equal to $(\delta_1+\delta_2)$, where $\delta_1$ and $\delta_2$ are the local edge sizes of these two wells.

The invention claimed is:

1. A computer implemented method of generating in three dimensions a hybrid grid of a hydrocarbon reservoir crossed by at least one geologic geometric discontinuity for forming a model representative of fluid flows in the hydrocarbon reservoir in accordance with a numerical scheme, comprising:

forming at least a first structured grid for gridding at least part of the hydrocarbon reservoir;

forming at least a second structured grid for gridding at least part of the at least one geologic geometric discontinuity;

providing a transition grid between the structured grids;

using a computer for forming at least one cavity around the second grid so that cells of the transition grid providing a transition between the structured grids have an intermediate size between a size of cells of the first grid and a size of cells of the second grid, from the following steps:

expanding the geologic geometric discontinuity using a local expansion coefficient $\alpha$ defined as a function of drainage radius r of the geologic geometric discontinuity, a local size $\delta_{reservoir}$ of the cells of the first structured grid and a local size $\delta_{well}$ of the cells of the second structured grid, wherein $\alpha$ is defined as:

$$\alpha = 1 + \frac{\delta_{well} + \delta_{resevoir}}{r}$$

determining cells of the first grid that intersect an image of the expanded geologic geometric discontinuity;

defining a boundary of the at least one cavity by assigning sites to quadrilaterals bordering the cavity;

forming the transition grid resting on the quadrilaterals bordering the at least one cavity by constructing a regular triangulation with respect to at least one constraint of admissibility constraints in a numerical scheme comprising conformity, convexity, orthogonality and self-centering of the cells; and optimizing the hybrid grid obtained by performing at least one of eliminating edges of a size below a value depending on at least one global parameter and on at least one local parameter and by eliminating and/or expanding the edges under control of quality criteria of the numerical scheme to change shape regularity of the hybrid grid; and displacing sites of the at least one cavity towards a center of mass thereof under control of quality criteria related to the numerical scheme.

2. A method as claimed in claim 1 wherein the quality criteria include:

orthogonality control wherein a transition cell is orthogonal if orthogonality thereof is greater than or equal to a fixed threshold;

planarity control wherein a transition cell is planar if its planarity is less than or equal to a fixed threshold; and self-centering control wherein a cell is self-centered if a site thereof is within the cell.

3. A method as claimed in claim 1, wherein determination of cells of the first grid that intersect the image of the expanded geologic geometric discontinuity comprises determining a first cell of the first grid present in the expanded geologic geometric discontinuity image and extending the at least one cavity by scanning iteratively in a vicinity of the cavity.

4. A method as claimed in claim 3, wherein bucket sorting is used to determine the first cell.

5. A method as claimed in claim 3, comprising smoothing a boundary of the cavity.

6. A method as claimed in claim 1, wherein construction of the transition grid comprises:

defining an internal site and an external site for each quadrilateral bordering the at least one cavity by defining a discretization point of the space and a weight for each one of the sites;

correcting sites of the at least one cavity to obtain for the transition grid non-empty and self-centered cells; and constructing a power diagram of the sites of the at least one cavity by providing conformity of the hybrid grid.

7. A method as claimed in claim 6, wherein the sites are defined from a Delaunay triangulation of vertices of the at least one cavity.

8. A method as claimed in claim 6, wherein the sites are defined from an evaluation of barycenters of circumscribed spheres of the cells sharing at least one side with a boundary of the at least one cavity.

9. A method as claimed in claim 6, wherein the sites are defined from an evaluation of the centers of circumscribed spheres of the cells sharing at least one side with the boundary of the at least one cavity.

10. A method as claimed in claim 9, wherein evaluation of the center of the circumscribed spheres for a cell sharing at least one side with the boundary of the at least one cavity comprises:

estimating a center of a sphere sharing at least one site with the boundary of the at least one cavity by determining a point in space passing closest to eight vertices of the cell, by an approximation based upon use of least squares;

determining a discretization point associated with the at least one site, by displacing iteratively in space the center, to minimize a maximum distance between the center and each vertice of a side of the cell shared with the at least one cavity; and defining a weight associated with each site of the at least one cavity by defining the weight as a mean distance form the discretization point to each vertex of a side of the cell shared with the at least one cavity.

11. A method as claimed in claim 6, comprising constructing the power diagram of the sites from tetrahedrons resulting from a three-dimensional regular triangulation of the sites of the at least one cavity.

12. A method as claimed in claim 6, comprising correcting the power diagram to obtain a conforming hybrid grid by replacing vertices of the cells of the transition grid belonging to a boundary side by a closest constraint vertex of each quadrilateral bordering the at least one cavity.

13. A method as claimed in claim 6, wherein construction of the power diagram comprises:

performing a determination of tetrahedrons from sites internal and external to the cavity; and replacing, during construction of the power diagram, centers of spheres circumscribing the tetrahedrons by a vertex of the at least one cavity common to the quadrilaterals associated with four sites forming each tetrahedron.

14. A method as claimed in claim 7, wherein the Delaunay triangulation is carried out incrementally.

15. A method as claimed in claim 11, wherein the regular triangulation is carried out incrementally.

16. A method as claimed in claim 1, wherein the numerical scheme comprises a two-point approximation of the fluid flows.

17. A method as claimed in claim 16, wherein the numerical scheme is a finite volume numerical scheme.

18. A method as claimed in claim 1, wherein the geometric discontinuity is a well and the second structured grid is a circular and radial type.

19. A method as claimed in claim 1, wherein the geometric discontinuity is a fracture and the second structured grid is a CPG type.

20. A method as claimed in of claim 1, wherein the quality criteria of the numerical scheme are applicable to polyhedral cells.

21. A method as claimed in of claim 19, wherein the quality criteria of the numerical scheme are applicable to polyhedral cells.

22. A method as claimed in claim 1, wherein the first grid is a non-uniform Cartesian and with parallelepipedic cells.

23. A method as claimed in claim 1, wherein the transition grid comprises convex polyhedral cells resting on quadrilaterals bordering the at least one cavity.

* * * * *